(12) United States Patent
Uenosono

(10) Patent No.: US 7,862,237 B2
(45) Date of Patent: Jan. 4, 2011

(54) HYDRODYNAMIC BEARING AND SPINDLE MOTOR AND INFORMATION RECORDING AND REPRODUCING APPARATUS EQUIPPED WITH THE SAME

(75) Inventor: Kaoru Uenosono, Ehime (JP)

(73) Assignee: Panasonic Corporation, Osaka (JP)

( * ) Notice: Subject to any disclaimer, the term of this patent is extended or adjusted under 35 U.S.C. 154(b) by 513 days.

(21) Appl. No.: 11/968,455

(22) Filed: Jan. 2, 2008

(65) Prior Publication Data
US 2008/0240633 A1 Oct. 2, 2008

(30) Foreign Application Priority Data
Mar. 29, 2007 (JP) ................ 2007-87454

(51) Int. Cl.
*F16C 32/06* (2006.01)
(52) U.S. Cl. .................... 384/100; 384/114
(58) Field of Classification Search ............ 384/100, 384/107, 114
See application file for complete search history.

(56) References Cited

U.S. PATENT DOCUMENTS

| | | | |
|---|---|---|---|
| 7,059,773 B2 | 6/2006 | Hafen et al. | |
| 7,063,462 B2 * | 6/2006 | Aiello et al. | 384/107 |
| 7,210,850 B2 * | 5/2007 | Kusaka et al. | 384/107 |
| 7,241,050 B2 * | 7/2007 | Uenosono et al. | 384/107 |
| 7,290,933 B2 * | 11/2007 | Braun et al. | 384/107 |
| 2006/0126979 A1 | 6/2006 | Uenosono et al. | |
| 2006/0133704 A1 | 6/2006 | Uenosono et al. | |
| 2006/0284504 A1 * | 12/2006 | Aiello et al. | 310/90 |
| 2007/0092172 A1 * | 4/2007 | Obara et al. | 384/107 |

FOREIGN PATENT DOCUMENTS

| | | |
|---|---|---|
| JP | 2006-161967 | 6/2006 |
| JP | 2006-161988 | 6/2006 |
| JP | 2006-162029 | 6/2006 |
| JP | 2006-170230 | 6/2006 |
| WO | 2006/061684 | 6/2006 |

* cited by examiner

*Primary Examiner*—Thomas R Hannon
(74) *Attorney, Agent, or Firm*—Wenderoth, Lind & Ponack, L.L.P.

(57) ABSTRACT

As axis direction dimensions become smaller in HDD spindle motors as a result of thinner and more compact designs, there is a demand for hydrodynamic bearings with a long lifespan. As a means of solving this problem, a lubricant reservoir section is formed between a sleeve side surface and a cover side surface with a depth varying in a circumferential direction, lubricant is circulated in a bearing gap section, a sleeve end face gap section larger than a bearing gap between a sleeve end face and the cover, and a connecting channel, and the lubricant reservoir section and the sleeve end face gap section are connected via an introducing gap section having a bubble separation function.

23 Claims, 10 Drawing Sheets

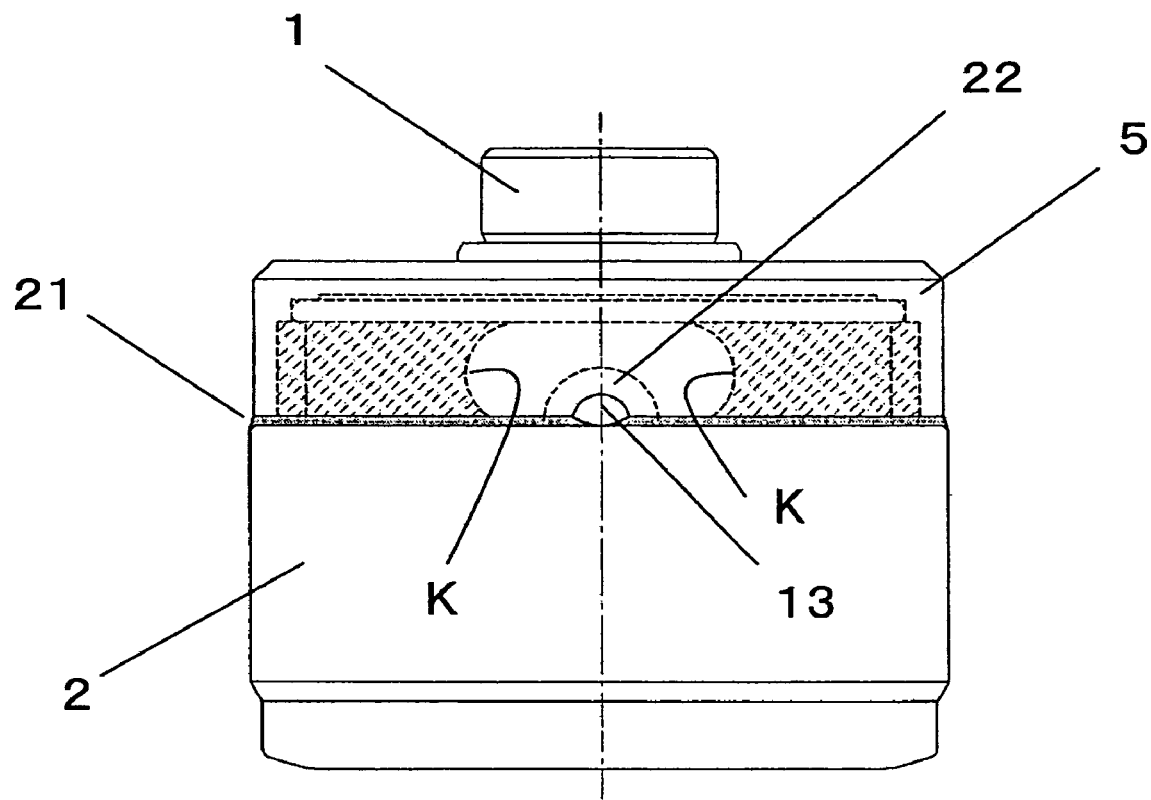
F I G. 6

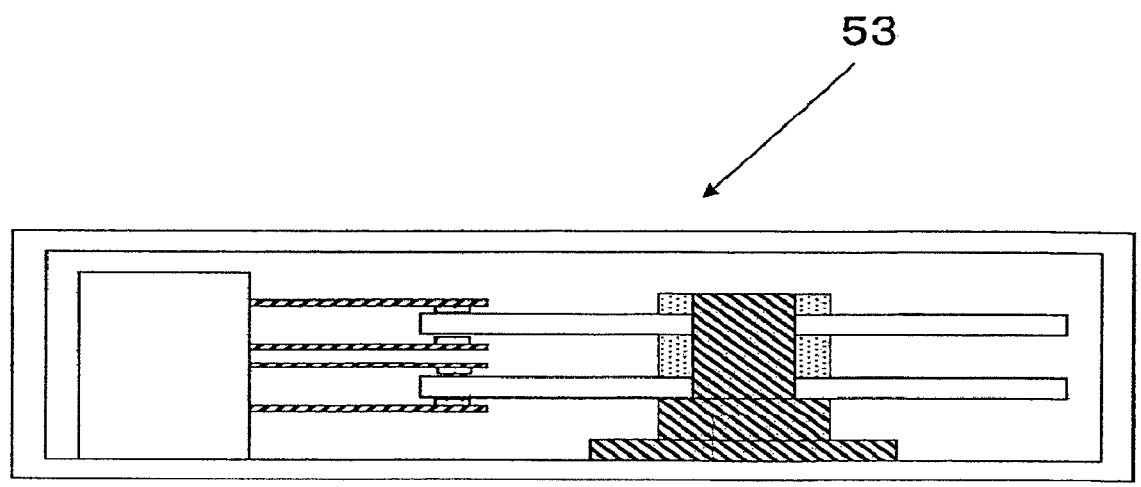
F I G. 9

HYDRODYNAMIC BEARING AND SPINDLE MOTOR AND INFORMATION RECORDING AND REPRODUCING APPARATUS EQUIPPED WITH THE SAME

BACKGROUND OF THE INVENTION

1. Field of the Invention

The present invention relates to spindle motors for driving the rotation of magnetic disks, optical disks, and the like; information recording and reproducing apparatuses; and hydrodynamic bearings used in the spindle motors and the like.

2. Description of the Related Art

Hydrodynamic bearings, having better rotation accuracy and also quietness than ball bearings, are being put to use in place of the ball bearing devices conventionally used as bearings for the spindle motors of hard disk devices and the like.

In recent years, furthermore, as hard disk devices have become standard equipment in laptop personal computers, and in addition, are seeing increasing levels of use in portable music players and cellular phones, factors such as thinner and more compact designs, lower power consumption, increased shock resistance, and increased lifespan are in demand.

Constraints are readily placed on axis direction dimensions in line with efforts to achieve thinner and more compact designs. As a result, how best to guarantee radial bearing dimensions in order to ensure the required levels of bearing angular stiffness has been a problematic issue. With regard to increasing lifespan, furthermore, how best to ensure a large oil reservoir of the bearing oil within limited bearing dimensions has been a problematic issue. And with regard to shock resistance, it is necessary to prevent the occurrence of oil leakage upon being exposed to shock. Accordingly, the reliability of the bearing device cannot be allowed to decrease with efforts to achieve thinner and more compact designs or increased lifespan.

A range of proposals have been put forth as a means of addressing these market requirements. For example, in some inventions, as shown in FIG. 10 (see U.S. Pat. No. 7,059,773), an equalizing volume 102 is formed on an outer peripheral surface of a cylindrical bearing sleeve 101, a covering cap 104 having a spacer 103 is disposed on an upper end face of the cylindrical bearing sleeve 101, and thereby a connecting channel 106 is formed between the covering cap 103 and a bearing gap 105. Furthermore, a re-circulation channel 107 is provided. In addition, the covering cap 104 is provided with a hole 108 on a side surface. The hole 108 is used when injecting a lubricant 109 following bearing assembly and is formed with a sufficiently small size that the lubricant 109 will not be thrown off as a result of shock or the like.

In the aforementioned bearing construction, the lubricant 109 moves inside a circulation channel including the bearing gap 105 and the re-circulation channel 107, eliminating imbalance in the internal pressure inside the bearing. In addition, the equalizing volume 102, also constituting an oil reservoir, is connected to the bearing gap 105 via the connecting channel 106, and is capable of supplying a vaporized portion of the lubricant 109 and of absorbing a thermal expansion portion of the lubricant 109 as a result of temperature.

In the construction of the aforementioned U.S. Pat. No. 7,059,773, as the equalizing volume 102, constituting the oil reservoir, can be arranged in parallel with the bearing gap 105, the necessary length of the radial bearing section formed by the bearing gap 105 can be secured, and therefore, the required bearing angular stiffness can be realized while also achieving a thinner and more compact design. In addition, as the equalizing volume 102, constituting the oil reservoir, is formed at an outer peripheral portion of the bearing sleeve 101, sufficient capacity can be secured within a range not affecting bearing performance.

In addition, the configurations disclosed in JP 2006-161988A, JP 2006-170230A, and JP 2006-161967 have been proposed as designs having a large oil reservoir and increased lifespan.

SUMMARY OF THE INVENTION

Nevertheless, in the hydrodynamic bearing disclosed by the aforementioned U.S. Pat. No. 7,059,773, the area of an interface boundary surface (a detailed view thereof not provided in U.S. Pat. No. 7,059,773) of the lubricant 109 formed by an outer periphery of a shaft 110 and an inner periphery of the covering cap 104 is extremely small when compared with the area of an interface boundary surface of the equalizing volume 102 formed on the outer periphery of the bearing sleeve 101. Accordingly, the surface tensions thereof cannot easily be equalized. In specific terms, as the surface tension of the interface boundary surface of the equalizing volume 102 is far larger, the interface boundary surface formed between the shaft 110 and the inner periphery of the covering cap 104 can easily rise. As a result, it is believed that the lubricant 109 can easily leak from an opening section.

The hydrodynamic bearing according to the present invention includes a shaft, a sleeve, a cover, a connecting channel, a lubricant, a sleeve end face gap section, a vent hole, and a first lubricant reservoir section. The sleeve is provided with a bearing hole having a closed end at one end and an open end at the other end, and the shaft is inserted into the bearing hole so as to be capable of relative rotation. The cover covers an end face and an outer peripheral surface of the sleeve at the open-end side thereof and at a distance forming a gap. The connecting channel connects a space region at the closed-end side of the sleeve and a gap region between the cover and the open-end side of the sleeve. The lubricant is retained within a sleeve-internal space including the space between the cover and the sleeve. In order that the lubricant moves from the connecting channel to the bearing hole, the sleeve end face gap section is formed between the cover and an end face at the open-end side of the sleeve and includes an introducing gap section formed in close proximity to an opening section of the connecting channel. The vent hole is formed in a space between an inner peripheral surface of the cover and an outer peripheral surface of the sleeve so as to connect with outside air and is connected to the introducing gap section. The first lubricant reservoir section is formed between the inner peripheral surface of the cover and the opposing outer peripheral surface of the sleeve by forming a depression in one of the sleeve and the cover, or both thereof so as to provide a space larger than the sleeve end face gap section. The first lubricant reservoir section is capable of storing lubricant therein and is shaped such that the gap between the inner peripheral surface of the cover and the outer peripheral surface of the sleeve grows larger as a distance from the vent hole in a circumferential direction decreases.

Here, the hydrodynamic bearing, circulating lubricant between the connecting channel and the bearing hole, is provided with the first lubricant reservoir section for storing lubricant between the outer peripheral surface of the sleeve and the inner peripheral surface of the cover and at a position of connection to the vent hole. The size of each gap is controlled such that the lubricant is pulled into a sleeve end face gap section between opposing surfaces of the cover and the sleeve. Furthermore, the sleeve end face gap section is formed so as to guide the lubricant from the connecting channel to the bearing-hole side.

As a result, even in situations where air bubbles having adhered to, for example, hydrodynamic grooves of a radial flow bearing are detached from the hydrodynamic grooves by a circulatory flow occurring upon relative rotation of the shaft and the sleeve and the air bubbles circulate, the air bubbles can be separated from the lubricant upon flow thereof into the introducing gap section from the connecting channel. The air bubbles then move to the first lubricant reservoir section, constituting a larger space than the introducing gap section, and are discharged from the vent hole. As a result of this, problems caused by air bubbles such as drops in bearing stiffness and drops in bearing performance due to, for example, instability in rotation during rotating operation can be prevented.

Furthermore, as the first lubricant reservoir section is formed on an outer peripheral surface side of the sleeve in the above-explained configuration, a gap in the axis direction usable for a bearing can be put to maximum effective use for radial bearings. Adverse effects on bearing characteristics can, therefore, be avoided, even in the case of hydrodynamic bearings of a thinner and more compact design.

In addition, the size of the storage space for lubricant in the first lubricant reservoir section can, for example, be modified easily by changing the size of the depression on the sleeve side. Accordingly, lifespan reduction caused by vaporization of the lubricant can be avoided, and deterioration of bearing characteristics due to, for example, changes in bearing length pursuant to the design of thinner, more compact hydrodynamic bearings can be prevented.

Furthermore, the introducing gap section, stimulating capillary action at the open-end side of the bearing hole, is provided in a region containing a section of the sleeve end face gap section, which is disposed between a back surface of the cover and the open-end side end face of the sleeve, directly above the connecting channel. In this configuration, as the gap expands towards the outer peripheral side from the open-end side, a lubricant delivered from the connecting channel flows into the bearing hole via the introducing gap section and the sleeve end face gap section as a result of a capillary force.

As a result of this configuration, a region of large capillary force is provided in the form of the sleeve end face gap section between the back surface of the cover and the open-end side end face of the sleeve. Accordingly, lubricant introduced from the introducing gap section is favorably supplied from a complete periphery to the open end of the bearing hole of the sleeve via the sleeve end face gap section. As a result, the bearing-hole open end of the sleeve can also be stably filled with lubricant.

Furthermore, the hydrodynamic bearing according to the present invention also includes a second lubricant reservoir section, connecting with the outside air and storing lubricant, on an inner peripheral surface of the cover opposing the shaft. This second lubricant reservoir section is configured so as to include an inclined surface inclined such that an internal diameter increases in line with separation from the open-end side end face of the sleeve in the axis direction. The second lubricant reservoir section is configured such that the surface tension of the lubricant stored in the second lubricant reservoir section and the surface tension of the lubricant in the first lubricant reservoir section of the outer peripheral surface side of the sleeve are substantially equalized.

As a result of this configuration, the surface tension of the interface boundary surface in the second lubricant reservoir section, formed on the inner peripheral surface of the cover opposing the shaft, and the surface tension of the interface boundary surface in the first lubricant reservoir section, formed between the inner peripheral surface of the cover and the outer peripheral surface of the sleeve, can be stably equalized. Accordingly, sudden changes in the position of the interface boundary surface and leakage of the lubricant as a result of movement of the interface boundary surface, for example, can be prevented.

Furthermore, if a gap of the sleeve end face gap section formed between the cover and the sleeve end face is defined as g1, a gap of the side surface gap section formed between the cover and the sleeve outer peripheral surface is defined as g2, and the minimum gap of the first lubricant reservoir section is defined as g3, then the relationship g1<g2<g3 is satisfied in the hydrodynamic bearing according to the present invention.

As a result of this configuration, the lubricant stored in the first lubricant reservoir section is supplied to the bearing hole after being smoothly moved to the sleeve end face gap section via the side surface gap section by capillary action. As a result, lubricant can be smoothly supplied from the first lubricant reservoir section, and the lubricant in the bearing hole can be prevented from running out.

In addition, the hydrodynamic bearing according to the invention includes a ventilation hole in an outer peripheral surface of the cover. The ventilation hole is formed having a semicircular shape or the shape of a section of a circle on a cover end face.

As a result of this configuration, it is possible to form covers including ventilation holes cheaply, with few man-hours, and without the use of die configurations having, for example, side pins.

In addition, the hydrodynamic bearing according to the present invention includes a thrust flange fixed to a tip of the shaft in a space region at the closed-end face side of the sleeve. An opening section of the connecting channel provided at the closed-end face side of the sleeve connects to the space wherein this thrust flange is provided.

As a result, the lubricant supplied from the open end of the bearing hole of the sleeve can be passed through to the sleeve end face section via a radial bearing provided between the inner peripheral surface of the sleeve and the outer peripheral surface of the shaft. Consequently, the lubricant can be smoothly supplied to the bearing section. Furthermore, as circulation pressure (pump pressure) from the radial bearing can be released via this connecting channel, the vicinity of the opening section of the connecting channel of the thrust flange section can maintain a pressure substantially equivalent to that of a bearing exterior portion. Accordingly, it is possible to prevent contact between the thrust flange and the sleeve resulting from a pressure imbalance caused by a difference in areas of upper and lower thrust-bearing surfaces formed on each of the upper and lower surface sides of the thrust flange.

In the hydrodynamic bearing according to the present invention, furthermore, the space region at the closed-end face side of the sleeve is formed by the tip of the shaft and a closed-end-face-side region closing plate. The opening section of the connecting channel provided on the closed-end face side of the sleeve connects to a space faced by the tip of this shaft.

As a result, the lubricant supplied from the open end of the bearing hole of the sleeve can be passed through to the sleeve end face section via a radial bearing provided between the inner peripheral surface of the sleeve and the outer peripheral surface of the shaft. Consequently, the lubricant can be smoothly supplied to the bearing section. Furthermore, as circulation pressure (pump pressure) from the radial bearing can be released via this connecting channel, the vicinity of the opening section of the connecting channel of the thrust flange section can maintain a pressure substantially equivalent to that of a bearing exterior portion. Accordingly, it is possible to prevent contact between the thrust flange and the sleeve resulting from a pressure imbalance caused by a difference in areas of upper and lower thrust-bearing surfaces formed on each of the upper and lower surface sides of the thrust flange.

In the hydrodynamic bearing according to the present invention, furthermore, hydrodynamic grooves provided on at least one of the outer peripheral surface of the shaft and the inner peripheral surface of the sleeve are shaped so as to impart circulating force to the lubricant.

As a result of this, lubricant can be stably supplied to the radial bearing and the thrust bearing. Furthermore, even in situations wherein air bubbles have been formed inside the bearing, the air bubbles can be smoothly discharged to the exterior via the connecting channel.

The hydrodynamic bearing according to the present invention is provided with a shaft, a sleeve having a closed end at one end and an open end of an opening which serves a bearing hole, and a cover covering an end face on the open-end side of the sleeve and an outer peripheral side surface section of the sleeve at a distance forming a gap or a space and with the shaft inserted into the bearing hole of the sleeve so as to be capable of rotating freely. A connecting channel is formed so as to connect the space region at the closed-end face side of the sleeve and a gap region between the cover and the open-end side of the sleeve, lubricant is retained in a sleeve internal space including a space between the cover and the sleeve, and a sleeve end face gap section is formed between the cover and the open-end side end face of the sleeve such that the lubricant moves from the connecting channel to the bearing hole. An introducing gap section connecting with the sleeve end face gap section is formed in a region in close proximity to an opening section of the connecting channel. A vent hole connects a space between a cover inner peripheral section and a sleeve outer peripheral side surface with the outside air. The introducing gap section and the vent hole are connected and a first lubricant reservoir section capable of storing lubricant is formed between the cover inner peripheral section and the opposing outer peripheral side surface of the sleeve by forming a depression in one of the sleeve and the cover, or both thereof so as to provide a space larger than the gap of the sleeve end face gap section. The first lubricant reservoir section is formed such that the separation distance between the inner peripheral side surface of the cover and the outer peripheral side surface of the sleeve grows larger as a distance from the vent hole side in a circumferential direction decreases.

In the above-explained configuration, when either the shaft or the sleeve is rotated relatively, the lubricant flows and circulates in the sleeve inner portion and the space between the sleeve and the cover. As this time, even in situations where air bubbles having adhered to, for example, hydrodynamic grooves of the radial flow bearing are detached from the grooves by the above-explained circulatory flow and circulate, the air bubbles can be separated from the lubricant upon flow thereof into a lubricant reservoir section from the connecting channel via the introducing gap section and can be discharged from the vent hole. As a result of this, problems caused by air bubbles such as drops in bearing stiffness and drops in bearing performance due to, for example, instability in rotation during rotating operation can be prevented.

Furthermore, as the first lubricant reservoir section is formed in the outer peripheral side surface section of the sleeve in the above-explained configuration, a gap in the axis direction usable for a bearing can be put to maximum effective radial-bearing usage. Accordingly, it is possible to reduce the effect even of efforts to achieve thinner and more compact hydrodynamic-bearing designs on bearing characteristics. Furthermore, as the size of the storage space can be easily changed by changing the size of the sleeve-side depression in order to avoid reduction of lifespan caused by the vaporization of lubricant, bearing characteristics are not adversely affected by, for example, changes in bearing length.

EFFECT OF THE INVENTION

As the first lubricant reservoir section is formed on the outer peripheral surface side of the sleeve, so as to pull the lubricant by capillary force into an introducing gap section formed on a sleeve end face, the hydrodynamic bearing according to the present invention makes it possible for bearing length (principally of radial bearings, but also of conical bearings) to be maximized, even in the case of thinner and more compact hydrodynamic bearings with insufficient space at the sleeve end side. Accordingly, by maintaining a sufficient charge of lubricant while also making best use of the characteristic benefits of a bearing containing a connecting channel, the lifespan of the hydrodynamic bearing can be increased and the reliability thereof can be improved.

Furthermore, a sleeve end face gap section stimulating capillary action in the same way as the gap at the open end of the bearing hole is formed between the back surface of the cover and an open-end side end face of the sleeve. The introducing gap section is connected to the sleeve end face gap section, and as a result of this configuration, the lubricant delivered from the connecting channel flows into the bearing hole via the introducing gap section and the sleeve end face gap section due to capillary action. Accordingly, lubricant introduced from the introducing gap section is favorably supplied from a complete periphery to the open end of the bearing hole of the sleeve via the sleeve end face gap section. Consequently, the open end of the bearing hole of the sleeve can be stably filled with lubricant. As a result, the inclusion of air bubbles in the lubricant does not readily occur, even in situations wherein the hydrodynamic bearing is exposed to shock from the exterior, and therefore, the reliability of the hydrodynamic bearing can be further improved.

BRIEF DESCRIPTION OF THE DRAWINGS

FIG. 6 is a side view of the hydrodynamic bearing seen from ventilation hole-side.

FIG. 9 is a view of an information recording and reproducing apparatus 53 using a spindle motor provided with the hydrodynamic bearing according to the present invention.

DETAILED DESCRIPTION OF THE INVENTION

The following is a description of a hydrodynamic bearing according to a preferred embodiment of the present invention, with reference to the accompanying drawings.

It should be noted that, in this embodiment, a case of usage of this hydrodynamic bearing in a spindle motor of a hard disk device is explained.

Figure 1:
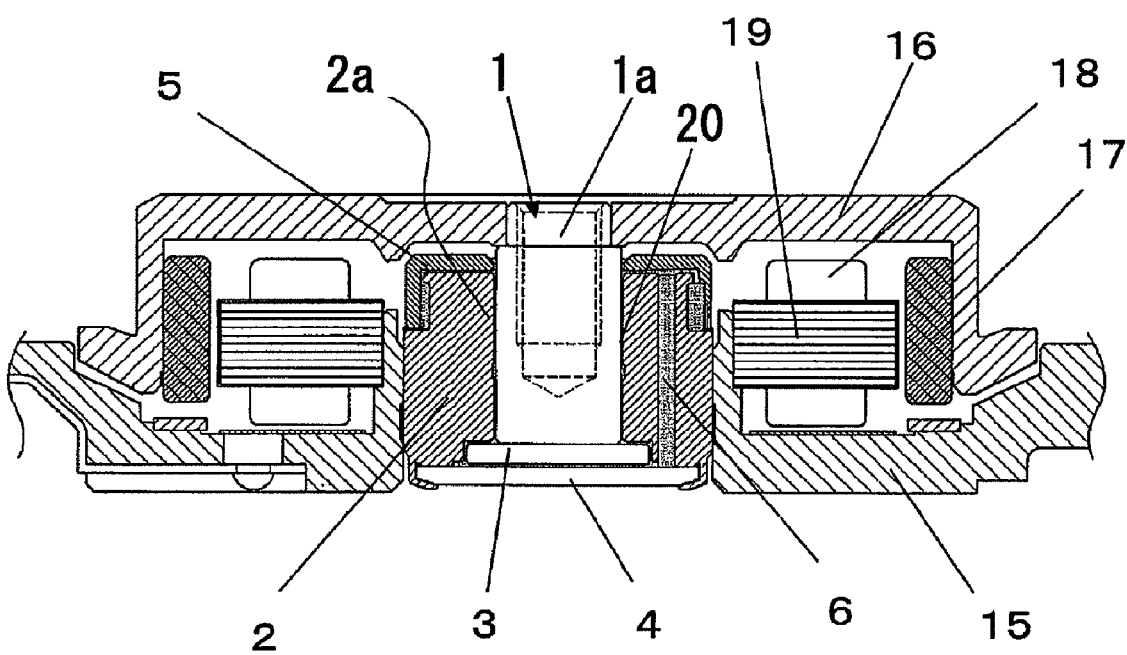
FIG. 1 is a cross-sectional view of a spindle motor provided with a hydrodynamic bearing according to an embodiment of the present invention.
Figure 2A:
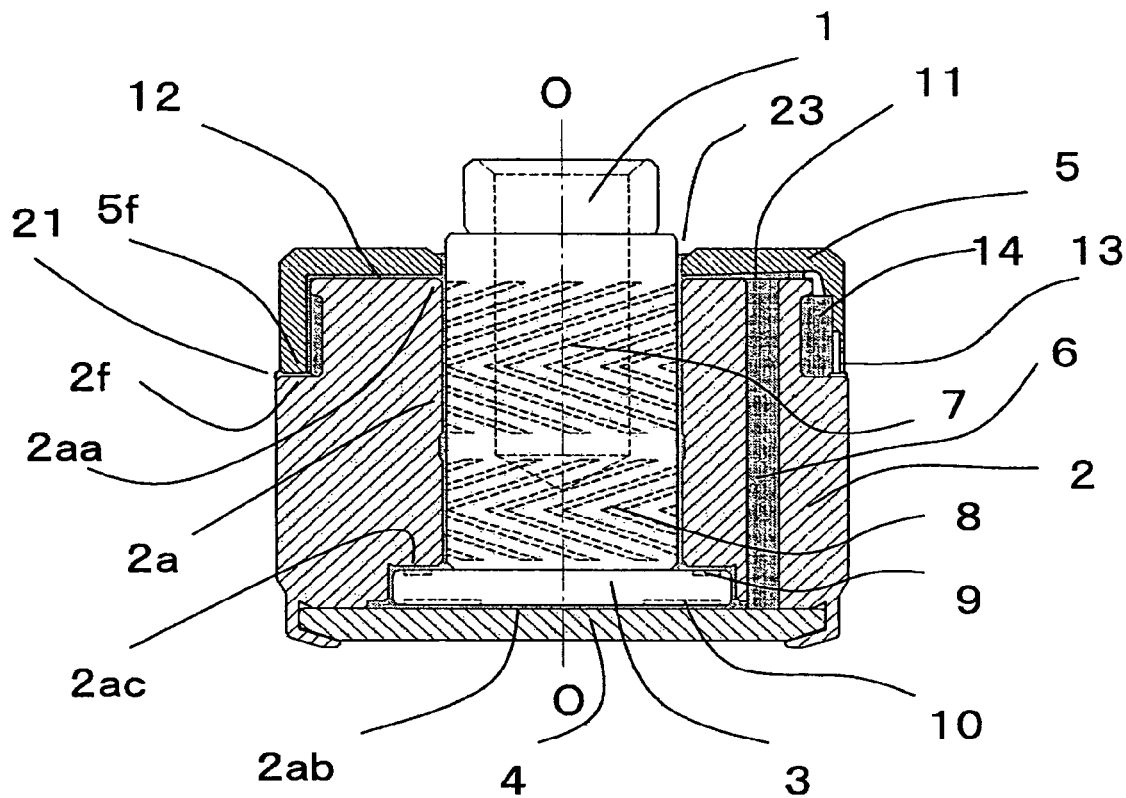
FIG. 2A is a cross-sectional view of the hydrodynamic bearing.
Figure 2B:
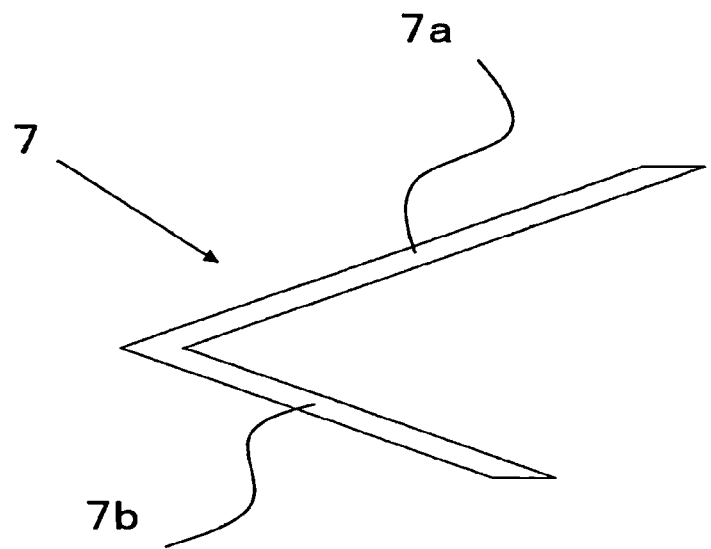
FIG. 2B is a view of a hydrodynamic groove thereof.
Figure 3:
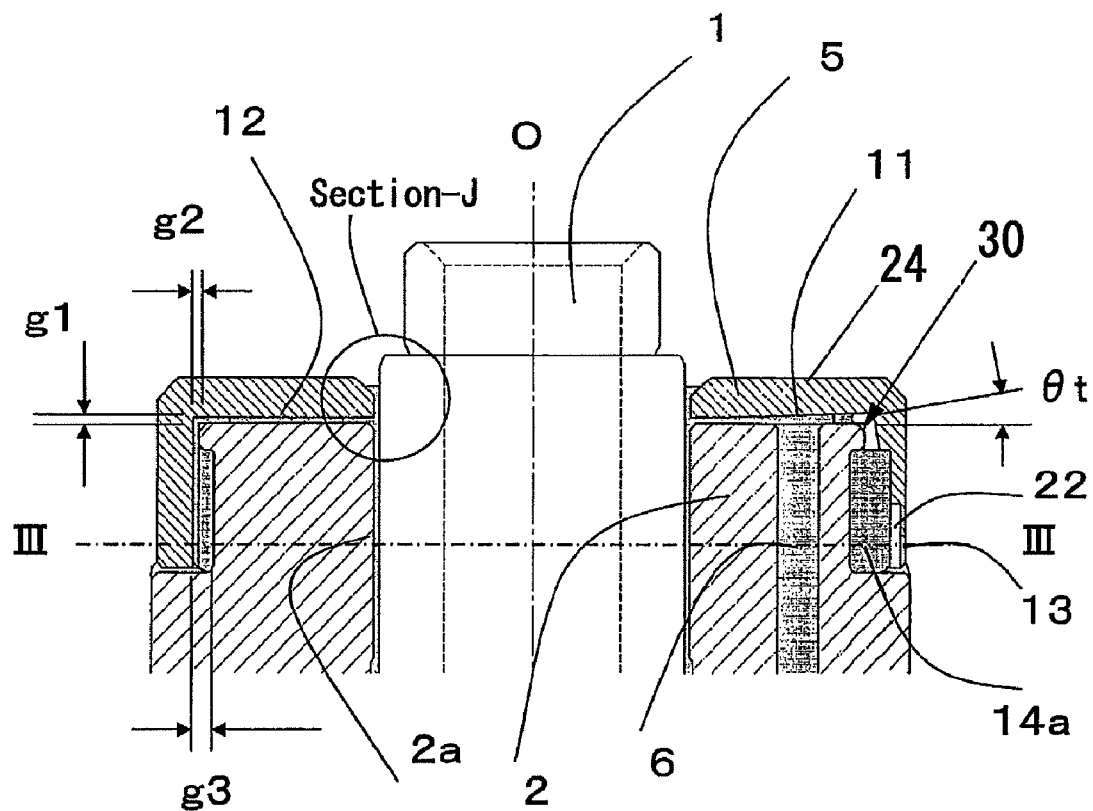
FIG. 3 is an enlarged cross-sectional view of an upper portion of the hydrodynamic bearing.
Figure 4:
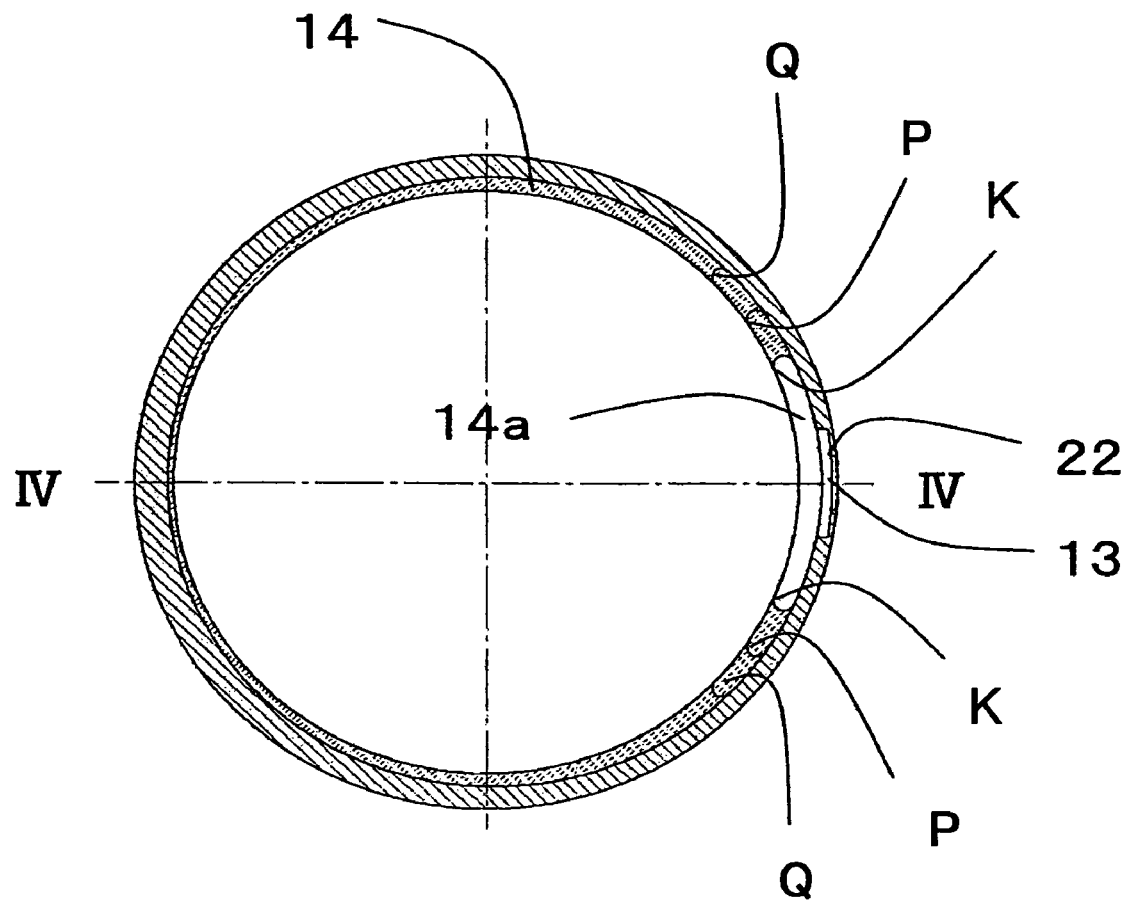
FIG. 4 is a cross-sectional view of the hydrodynamic bearing taken along line III-III of FIG. 3.

FIG. 1 is a cross-sectional view of a spindle motor provided with a hydrodynamic bearing according to an embodiment of the present invention. FIG. 2A and FIG. 2B is a cross-sectional view of the hydrodynamic bearing and enlarged view of a hydrodynamic groove. FIG. 3 is a detail view thereof. FIG. 4 is a cross-sectional view taken along line III-III of FIG. 3. It should be noted that, although a configuration wherein an open end of a bearing hole of a sleeve is disposed above and a closed end is disposed below for ease of understanding in the following explanation as shown in FIG. 1, FIG. 2A, and FIG. 3, cases of practical usage are, of course, not limited to this configuration.

A hydrodynamic bearing included in a spindle motor of this embodiment includes a shaft 1, a sleeve 2, a large-diameter thrust flange 3, and a thrust plate 4 as shown in FIG.1 through FIG. 3. As regards the materials for each member, for example, stainless steel or chrome-manganese steel can be used for the shaft, and stainless steel can be used for the thrust flange. In addition, the sleeve can be manufactured from copper alloy such as brass subjected to electroless nickel plating, or stainless steel. A stainless steel plate subjected to DLC coating or the like can be used for the thrust plate.

The sleeve 2 is secured to a base 15 of the spindle motor and has a bearing hole 2a including an open, upper-side open end 2aa and a closed, lower-side closed end 2ab, and the shaft 1 is inserted via an interval or space so as to be capable of rotating freely.

The large-diameter thrust flange 3 is secured to a lower end portion of the shaft 1 by fitting and bonding or using a screw, and in addition, is disposed at a large-diameter hole section 2ac constituting a closed-end side in the bearing hole 2a at a distance forming a gap with the top surface of the large-diameter hole section 2ac.

The thrust plate 4 is secured to a bottom portion of the sleeve 2 so as to oppose a lower surface of the thrust flange 3 at a distance forming a gap.

In addition to these configuration elements, this embodiment provides a cover 5 including a material having a translucent or transparent property (polyetherimide resin or polyethersulfone resin, for example) and covering an upper end face (or open-end side end face) and an outer-peripheral side surface section of the sleeve 2 at a distance forming a space. Furthermore, the cover 5 is provided with a vent hole 13 connecting to the outside air at an outer peripheral side surface section.

A connecting channel 6 (for example, between approximately 0.2 and 0.6 mm in diameter) extending in a direction substantially parallel to an axis O passes through this hydrodynamic bearing at a position within the sleeve 2 near an outer peripheral surface thereof. This connecting channel 6 connects the large-diameter hole section 2ac provided at the closed end 2ab side of the bearing hole 2a (that is, a space region at the closed-end face side) to the space region between the cover 5 and the upper-end face of the sleeve 2, constituting an open end 2aa side end face thereof.

Furthermore, internal spaces of the sleeve 2 including the space between the cover 5 and the sleeve 2 (that is, a space between an outer peripheral surface of the shaft 1 and an inner peripheral surface of the sleeve 2, a space inside the large-diameter hole section 2ac of the bearing hole 2a, a space at a connecting location between the large-diameter hole section 2ac of the bearing hole 2a and the connecting channel 6, a space inside the connecting channel 6, a space between the upper end face of the sleeve 2 and the cover 5, and a space between the outer-peripheral side surface section of the sleeve 2 and an internal periphery of the cover 5 (not including the vent hole 13)) are filled with a lubricant 20, such as lubricating oil. Superfluid grease or ionic liquid can also be used as the lubricant. It should be noted that, as shown enlarged in FIG. 7, the internal peripheral surface of the cover 5 opposing the shaft 1 is provided with an inclined surface widening in line with separation from the open end in the axis direction, forming a second lubricant reservoir section 23 connecting with the outside air and storing the lubricant 20. In addition, a step section end face 2f of the sleeve 2 and an end face 5f of the cover 5 are secured using adhesive 21 and configured such that the lubricant 20 cannot leak out to the exterior from the bonding surface of the sleeve 2 and the cover 5.

A pair of hydrodynamic grooves 7, 8 are formed arranged vertically having, for example, a fish-bone pattern on the internal peripheral surface of the sleeve 2. It should be noted that the hydrodynamic grooves 7, 8 can be provided either on the outer peripheral surface of the shaft 1 or on both the inner peripheral surface of the sleeve 2 and the outer peripheral surface of the shaft 1. When the shaft 1 and the sleeve 2 are rotated relatively by a rotation drive force as explained hereinafter, a radial bearing wherein the shaft 1 and the sleeve 2 are supported by a force of the lubricant 20 collected and drawn out by these hydrodynamic grooves 7, 8 so as to be capable of rotating relatively and freely at a fixed interval in a radial direction is configured. In addition, hydrodynamic grooves 9, 10 are formed having, for example, a helical shape on an upper surface and lower surface of the thrust flange 3. It should be noted that the hydrodynamic grooves 9, 10 can be provided on an opposing lower surface of the sleeve 2 and upper surface of the thrust plate 4, or alternatively, on upper and lower surfaces of the thrust flange 3, a lower surface of the sleeve 2, and an upper surface of the thrust plate 4. When the thrust flange 3 mounted on the shaft 1 and the sleeve 2 are rotated relatively by, for example, a rotation drive force, a thrust bearing wherein the shaft 1 and the sleeve 2 are supported by a force of the lubricant 20 collected and drawn out by these hydrodynamic grooves 9, 10 so as to be capable of rotating freely at a fixed interval in a thrust (or axial) direction is configured. Here, the hydrodynamic grooves 7, 8 of the radial bearing are of a widely-known herringbone shape and are formed in two locations. Specifically, the hydrodynamic grooves 7, 8 are formed at an upper side and a lower side of an outer peripheral surface of the shaft 1. The lower hydrodynamic groove 8 is formed such that an inclined groove rising from a peak section thereof and an inclined groove descending from the peak section thereof are of same length. Meanwhile, as shown in FIG. 2A and FIG. 2B, the upper hydrodynamic groove 7 is formed such that an inclined groove 7a rising from a peak section thereof is longer than an inclined groove 7b descending from the peak section thereof. The configuration is such that, upon driving of rotation, the lubricant 20 in this gap is actively delivered downward by this upper hydrodynamic groove 7.

As shown in FIG. 1, a hub 16 is press fitted onto an outer periphery of a protruding shaft section 1a of the shaft 1 protruding from the bearing hole 2a of the sleeve 2, the hub 16 constituting a rotation member with, for example, a magnetic recording disk being secured on an outer periphery thereof. In this embodiment, a rotor magnet 17 is mounted on an outer periphery of a section of the hub 16 close to a base 15. Furthermore, a stator core 19, whereupon a stator coil 18 is wound, is mounted on the base 15 so as to oppose the rotor magnet 17. This rotor magnet 17 and stator core 19 constitute a rotation drive section of a spindle motor delivering rotation drive force to the shaft 1 and the sleeve 2.

Figure 5:
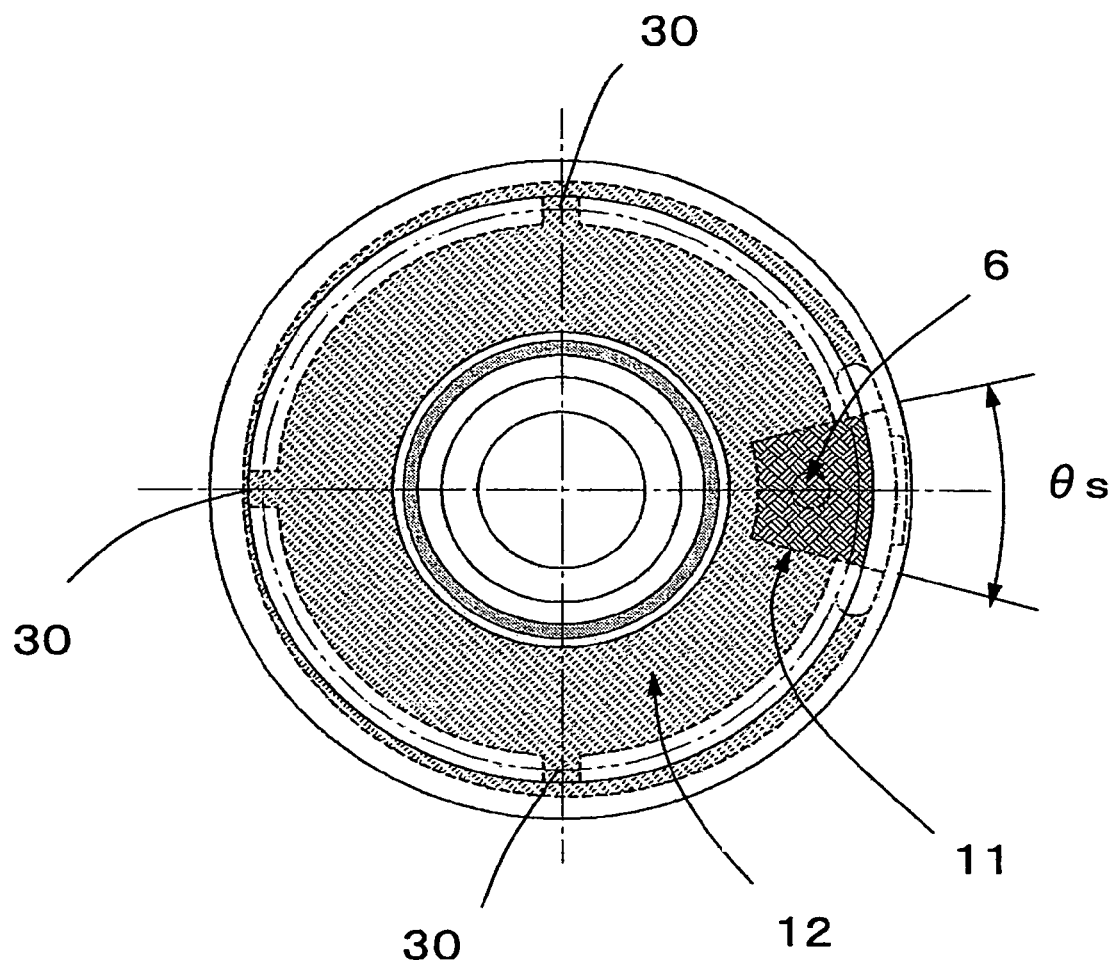
FIG. 5 is a see-through view from a top surface of the hydrodynamic bearing.

In addition, as shown in FIG. 2A and FIG. 2B, the upper end face of the sleeve 2 opposing the cover 5 is formed having a substantially planar shape. In contrast, as shown in FIG. 3, an introducing gap section 11 stimulating capillary action at an inner peripheral side in a radial direction is provided on the cover 5 in a region in close proximity to the opening section of the connecting channel 6 on the upper end face of the sleeve 2. This introducing gap section 11 is formed such that a gap grows larger towards an outer periphery. Furthermore, the back surface of the cover 5 other than in a region in close proximity to the opening section is disposed approximately parallel to the upper end face of the sleeve 2 at a distance forming a gap equivalent to the smallest gap of the introducing gap section 11. The separation distance between the inner peripheral surface of the cover 5 and the upper portion of the outer peripheral surface of the sleeve 2 is, a dimension g1 (as shown in FIG. 3), stimulating capillary action from a first lubricant reservoir section 14, as shown in FIG. 4, towards an upper surface portion of the sleeve 2. A gap (the introducing gap section 11 and a sleeve end face gap section 12) wherethrough lubricant flows with respect to the bearing hole 2a of the inner peripheral surface of the sleeve 2 as a result of capillary action, is thus formed. It should be noted that, for ease of understanding, the separation space between the inner peripheral surface section of the cover 5 and the opposing outer peripheral surface side section of the sleeve 2 is shown conceptually in FIG. 4. In addition, this introducing gap section 11 is, as shown in FIG. 3 and FIG. 5, formed so as to connect a position in close proximity to the opening section of the connecting channel 6 to the open end of the bearing hole 2a of the sleeve 2 via the sleeve end face gap section 12.

It should be noted that in this embodiment, the introducing gap section 11 is, when viewed from above in an axis direction, an approximately fan-shaped section with an opening angle θs of approximately 30 degrees, and is formed so as to have a wider range than the opening section of the connecting channel 6. Here, a separating boundary between a region of the introducing gap section 11 and a region of the sleeve end face gap section 12 is a fan-shaped annular boundary widening towards an outer periphery. However, when a taper shape of an angle θt as explained hereinafter is provided, the opposing sides of this boundary can be parallel. The inner-peripheral side boundary of the region of the introducing gap section 11 is either outside the bearing hole 2a or in an equivalent region to the bearing hole 2a.

Furthermore, the introducing gap section 11 is, when viewed laterally as a cross-section as shown in FIG. 3, formed having a tapered shape of angle θt larger than 0 degrees and increasing in size towards an outer peripheral side. The lubricant 20 circulated from the connecting channel 6 is moved towards an inner peripheral side as a result of capillary action due to this fan-shaped annular shape and tapered shape. As a result, air bubbles contained therein are moved towards an outer peripheral side, subjected to gas-liquid separation in the introducing gap section 11, passed through a side-surface gap section 30 formed between the cover 5 and the sleeve 2, and discharged to the vent hole 13 provided in the first lubricant reservoir section 14. In addition, the diameter of the open end of the bearing hole 2a on the upper end face of the sleeve 2 is, for example, between 2.8 and 3.2 mm. The gap of the introducing gap section 11 is, for example, between 0.03 and 0.15 mm. In this embodiment, furthermore, the introducing gap section 11 is formed such that a gap widens towards an outer side in a radial direction, and the separation gap of the sleeve end face gap section 12 is constant in a radial direction.

In particular, the first lubricant reservoir section 14 capable of storing lubricant 20 is formed as a depression in the inner peripheral surface of the cover 5 and the outer peripheral surface of the sleeve 2 so as to provide a space larger than the gap of the introducing gap section 11 and of the sleeve end face gap section 12. In addition, the first lubricant reservoir section 14 connects the introducing gap section 11 and the vent hole 13 in an axis direction. It should be noted that this first lubricant reservoir section 14 has, for example, a width in the axis direction of between approximately 0.5 and 1.5 mm, a minimum gap in a radial direction of between approximately 0.03 and 0.15 mm, and a maximum gap in the radial direction of between approximately 0.15 and 0.3 mm. The vent hole 13 has a radius of, for example, between approximately 0.15 and 0.5 mm. A recess section 22 (for example, a radius of between approximately 0.3 and 0.8 mm, and a depth of between approximately 0.1 and 0.3 mm) is provided as a buffer space and in the form of a countersunk hole at the location wherein this vent hole 13 is provided. The separation distance is greatest from the outer peripheral surface of the sleeve 2 at the portion of the first lubricant reservoir section 14 connecting with this vent hole 13 and the recess section 22 (referred to as a maximum space section 14a) and that portion is inclined in a radial direction such that the separation distance from the outer-peripheral side surface section of the sleeve 2 becomes larger upon drawing closer to the maximum space section 14a from an opposing direction about the axis O as center. It should be noted that, in this embodiment, the separation gap of the first lubricant reservoir section 14 is constant in the axis direction. In addition, in this embodiment, the vent hole 13 connecting with the outside air is provided at a position on the cover 5 wherein, in a plan view, the vent hole 13 and the opening section of the connecting channel 6 are arranged in the same direction with respect to the axis center O. Furthermore, as shown in FIG. 4 and FIG. 6, formation of the recess section 22 on the vent hole 13 ensures that, even in cases wherein the lubricant 20 has reached full volume and, for example, the temperature of the disposition environment rises, the interface boundary surface K of the lubricant 20 remains inside the recess section 22 and the lubricant 20 does not leak out via the vent hole 13.

Furthermore, as shown in FIG. 6, the vent hole 13 is formed with an approximately semicircular shape or the shape of a section of a circle on an end face of the cover 5. Accordingly, when the cover 5 is formed by, for example, resin molding, there is no need for the die to have a complicated configuration including side pins and the like, and therefore, the die can be cheaply produced and man-hours can be reduced.

Figure 7:
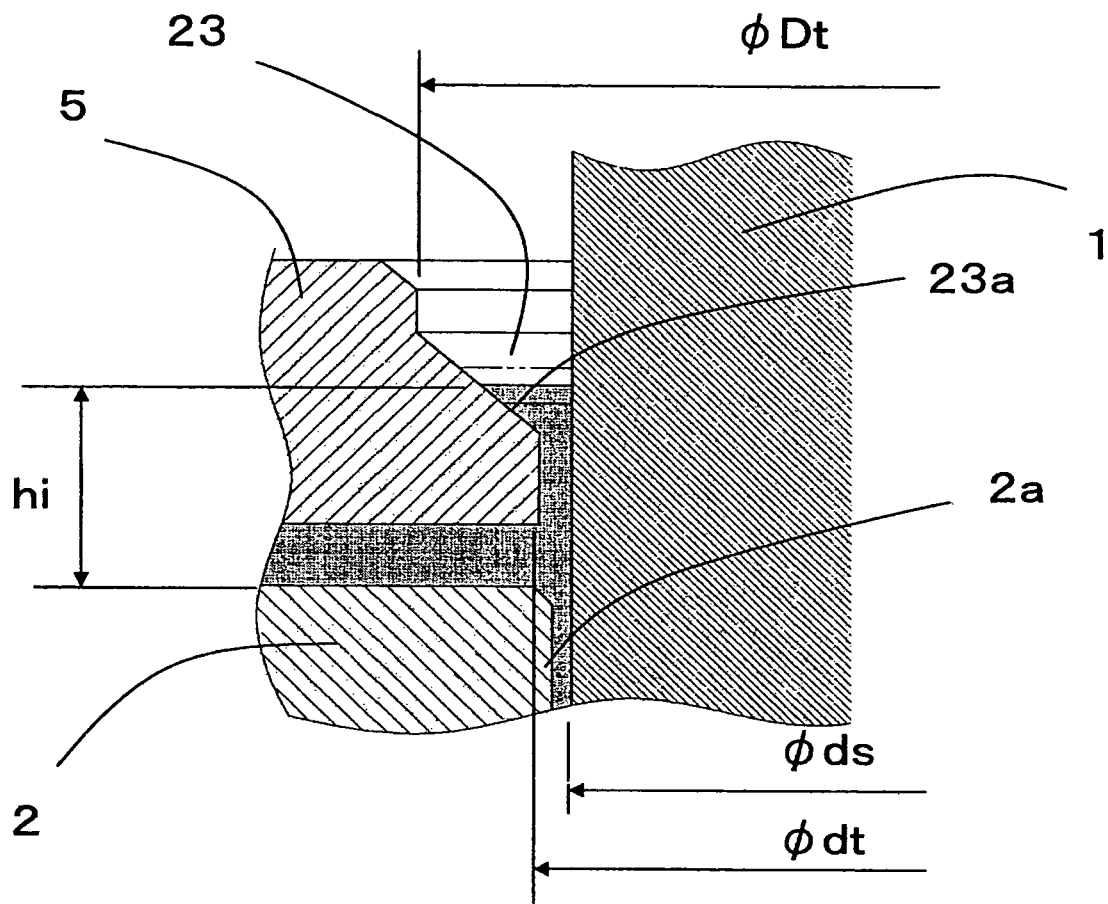
FIG. 7 is an enlarged cross-sectional view of Section J of FIG. 3 showing a second lubricant reservoir section of the hydrodynamic bearing.

Furthermore, as shown enlarged in FIG. 7, the second lubricant reservoir section 23 is formed so as to widen towards an opening side on an inner peripheral surface of the cover 5 opposing the shaft 1. In specific terms, the second lubricant reservoir section 23 is provided with an inclined surface 23a inclined such that the second lubricant reservoir section 23 becomes narrower in a downward axis direction. Accordingly, a diameter Dt at an upper end of the inclined surface 23a and a diameter dt at a lower end of the inclined surface 23a are set such that, even in situations wherein, as explained hereinafter, the position of the interface boundary surface within the first lubricant reservoir section 14 changes as a result of reduction of the lubricant 20 due to, for example, vaporization, the interface boundary surface is equalized within the range of motion on the inclined surface 23a within this second lubricant reservoir section 23.

As shown in FIG. 3, furthermore, a lube-repellant coating recess 24 is also formed at an upper-surface outer peripheral section of the cover 5 so as to prevent lubricant 20 from falling to the exterior upon the charging thereof following assembly of this hydrodynamic bearing. The lube-repellant coating recess 24 is, for example, a groove having an inner diameter of between approximately 3.5 and 6.0 mm, a width of between approximately 0.2 and 1.0 mm, and a depth of between approximately 0.03 and 0.1 mm.

When, in the above-explained configuration, the shaft 1 and the sleeve 2 are rotated relatively by a rotation drive force of a spindle motor, the shaft 1 is supported in a condition wherein a fixed gap is maintained with respect to the sleeve 2 by the force of the lubricant 20 drawn out by the hydrodynamic grooves 7, 8 of the radial flow bearing and the force of the lubricant 20 collected and drawn out by the hydrodynamic grooves 9, 10 of the thrust flow bearing. Accordingly, the lubricant 20 between the shaft 1 and the sleeve 2 is delivered downward in an axis direction by the force of the lubricant 20 collected and drawn out by the upper hydrodynamic groove 7 of the radial flow bearing in the axis direction. Accordingly, the lubricant 20 passes in sequence through the space between the thrust flange 3 and the sleeve 2, the space between the sleeve 2 and the thrust plate 4, the space inside the connecting channel 6, the introducing gap section 11, and the sleeve end face gap section 12, and flows once again into the space between the shaft 1 and the sleeve 2. In this way, the lubricant 20 circulates actively within these spaces. Furthermore, a portion of the lubricant 20 introduced to the introducing gap section 11 from the connecting channel 6, while also flowing through the sleeve end face gap section 12, again flows into the space between the shaft 1 and the sleeve 2 via the smallest gap at the outer periphery of the bearing hole 2a.

Therefore, even in situations wherein air bubbles adhere to, for example, the hydrodynamic grooves 7, 8 of the radial flow bearing or the hydrodynamic grooves 9, 10 of the thrust flow bearing, the air bubbles are detached from the hydrodynamic grooves 7, 8 and the hydrodynamic grooves 9, 10 by the circulatory flow of the lubricant 20. Upon passage through the introducing gap section 11 from the connecting channel 6, the air bubbles flow into the lower-pressure first lubricant reservoir section 14. As the air bubbles grow larger upon flow thereof into the lower-pressure first lubricant reservoir section 14, it becomes difficult for the air bubbles to again enter the higher-pressure introducing gap section 11 and the sleeve end face gap section 12. For this reason, air bubbles are separated from the lubricant 20 in the first lubricant reservoir section 14 and are discharged from the vent hole 13.

In this embodiment, as explained above, it is possible to actively discharge air bubbles from inside the lubricant 20 even during normal rotation drive. As a result of this, problems caused by air bubbles such as drops in bearing stiffness and drops in bearing performance due to, for example, instability in rotation during rotating operation can be prevented, and the reliability of the hydrodynamic bearing can be improved.

In addition, this hydrodynamic bearing not only provides a second lubricant reservoir section 23 on the inner peripheral surface of the cover 5 facing the shaft 1, but also provides a large capacity space section for holding a lubricant 20 (the first lubricant reservoir section 14) between the outer peripheral surface of the sleeve 2 and the cover 5. Therefore, even in situations where the volume of lubricant in the first lubricant reservoir section 14 has reduced, the introducing gap section 11 and the sleeve end face gap section 12 are filled with the lubricant 20 through an action of a capillary force, and circulating functionality can be maintained.

Figure 10:
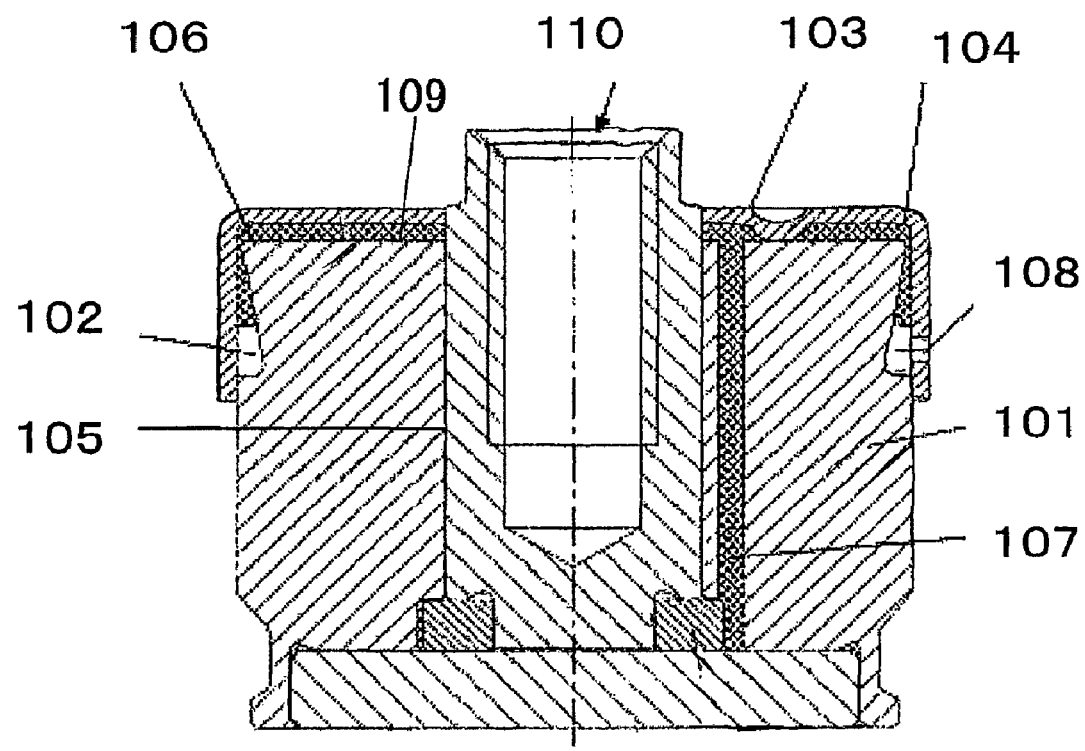
FIG. 10 is a cross-sectional view of a conventional hydrodynamic bearing.

In particular, the present invention makes possible formation of the first lubricant reservoir section 14 such that separation distance from the outer peripheral side surface of the sleeve 2 increases upon drawing closer to the maximum space section 14a provided with the vent hole 13 from a direction of a section symmetric to the introducing gap section 11 about the axis O, or in other words, formation of the first lubricant reservoir section 14 so as to be inclined in a circumferential direction. For this reason, even in situations wherein the hydrodynamic bearing is exposed to shock from the exterior or undergoes sudden changes in attitude, the interface boundary surface between the air and the lubricant 20 in the first lubricant reservoir section 14 remains in close proximity to the vent hole 13 and motion thereof in a circumferential direction is prevented. As a result, leakage of lubricant 20 to the exterior pursuant to motion of air bubbles can be prevented. Furthermore, the size of the storage space cross-sectional area of the first lubricant reservoir section 14 is inversely proportional to distance from the vent hole 13. As shown in FIG. 4 by positions P, Q of the interface boundary surface upon reduction of the charge of lubricant 20, the interface boundary surface ordinarily extends in an axis direction. Compared with a hydrodynamic bearing configured with a ring-shaped interface boundary surface as shown in FIG. 10, therefore, variation in the area of the interface boundary surface and associated variation in surface tension in the first lubricant reservoir section 14 can be reduced.

Furthermore, the sleeve end face gap section 12 stimulating capillary action is formed between the back surface of the cover 5 and an upper surface of the sleeve 2. As a result, the lubricant 20 introduced from the introducing gap section 11 is favorably supplied from a complete periphery to the bearing hole 2a of the sleeve 2 via this sleeve end face gap section 12, maintaining a stable, full condition thereof in the bearing hole 2a of the sleeve 2.

Furthermore, inside diameters of the second lubricant reservoir section 23 (the diameter Dt at an upper end of the inclined surface 23a and the diameter dt at a lower end of the inclined surface dt) are formed such that the surface tension of the lubricant 20 stored in the second lubricant reservoir section 23 and the surface tension of the lubricant 20 stored in the first lubricant reservoir section 14, facing the vent hole 13, are substantially equalized. Accordingly, sudden changes in the position of the interface boundary surface of the lubricant 20 in the second lubricant reservoir section 23 and leakage of lubricant 20 as a result of movement of the interface boundary surface can be prevented.

Hereinafter, this point is explained in detail.

Figure 8:
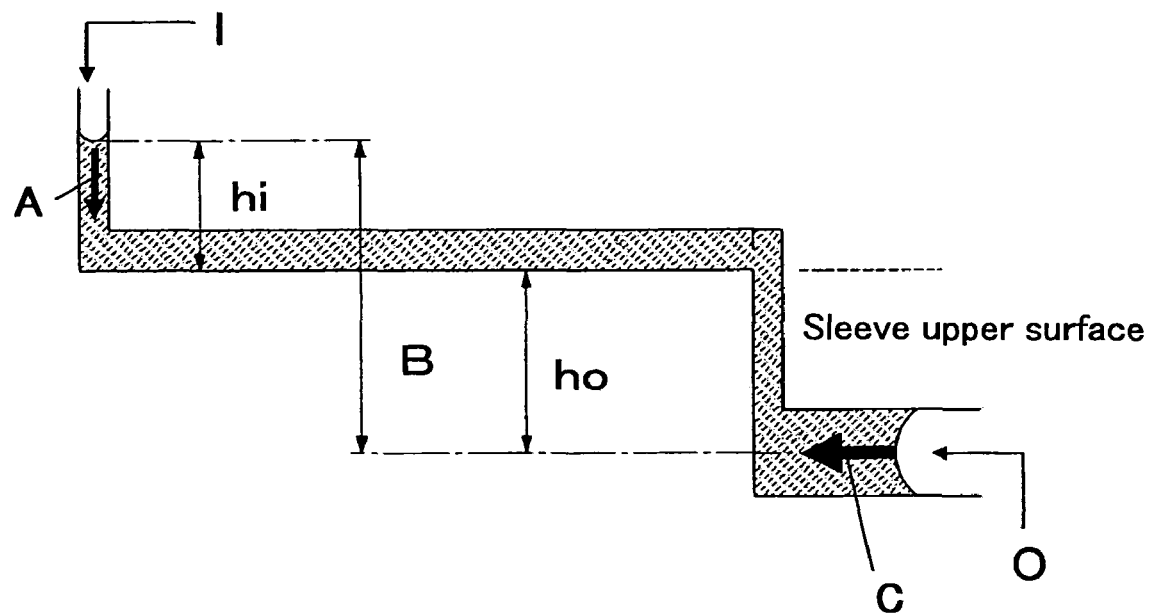
FIG. 8 is a conceptual view showing equalization of pressures between the second lubricant reservoir section and a first lubricant reservoir section of the hydrodynamic bearing.

FIG. 8 is a conceptual view showing the balancing of pressure between the second lubricant reservoir section 23 and the first lubricant reservoir section 14 of the hydrodynamic bearing of this embodiment. Here, A is a pressure due to surface tension of the interface boundary surface in the second lubricant reservoir section 23, B is volumetric pressure due to a difference in the position of the interface boundary surfaces, and C is a pressure due to surface tension of the interface boundary surface in the first lubricant reservoir section 14. Furthermore, $\gamma$ is a surface tension [N/m] of oil (lubricant); $\rho$ is the density [kg/m$^3$] of the oil; Li is the length of contact between the interface boundary surface of the oil and a member at the interface boundary surface I; Ai is an area of the interface boundary surface of the oil at the interface boundary surface I; Lo is the length of contact between the interface boundary surface of the oil and a member at the interface boundary surface O; Ao is an area of the interface boundary surface of the oil at the interface boundary surface O; hi is a height from an upper surface of the sleeve to the interface boundary surface I; ho is an average height (t/2) from the upper surface of the sleeve to the interface boundary surface O; and θ is a contact angle between a member and the interface boundary surface of the oil.

In terms of the model shown in FIG. 8, the formula for balancing of pressures is;

$$A=B+C [Pa] \quad \text{Formula 1:}$$

A, B, and C of Formula 1 are calculated as follows.

$$A=(\gamma \cdot \cos \theta \times Li)/Ai \quad \text{Formula 2:}$$

$$B=\rho \cdot (hi-ho) \quad \text{Formula 3:}$$

$$C=(\gamma \cdot \cos \theta \times Lo)/Ao \quad \text{Formula 4:}$$

Substituting Formula 2, Formula 3, and Formula 4 into Formula 1 gives the following.

$$Li/Ai=\{1/(\gamma \cdot \cos \theta)\} \times [\rho \cdot (hi-ho)+\{(\gamma \cdot \cos \theta)+Lo\}/Ao] \quad \text{Formula 5:}$$

Substituting the following Formula 6 and Formula 7 into Formula 5 and defining the right-hand side of the equation as Z gives Formula 6.

$$Li=\pi(ds+Dts) \quad \text{Formula 6:}$$

$$Ai=\pi\{(Dts/2)^2-(ds/2)^2\} \quad \text{Formula 7:}$$

$$(ds+Dts)/\{(Dts/2)^2-(ds/2)^2\}=Z \quad \text{Formula 8:}$$

The diameter Dts of the second lubricant reservoir section 23 is found by expanding Formula 8 and resolving the equation as follows.

$$Dts=\{1+SQRT(1+Z(ds+Z\times ds^2/4))\}/(Z/2) \quad \text{Formula 9:}$$

By finding the diameter Dts for the largest and smallest interface boundary surfaces of the oil using Formula 9 and setting the inner diameters of the top seal (dt, Dt) so as to fully accommodate the range of motion of that interface boundary surface, the surface tension of the lubricant 20 stored in the second lubricant reservoir section 23 and the surface tension of the lubricant 20 stored in the first lubricant reservoir section 14, facing the vent hole 13, are substantially equalized. Accordingly, sudden changes in the position of the interface boundary surface of the lubricant 20 in the second lubricant reservoir section 23 and leakage of lubricant 20 as a result of due to movement of the interface boundary surface can be prevented.

In the above-explained embodiment, furthermore, a lube-repellant coating recess 24 for coating of lube repellant is formed as a depression in an upper-surface outer peripheral section of the cover 5. Accordingly, the lube-repellant coating recess 24 prevents the lubricant 20 from flowing and falling from an upper surface of the cover 5 upon the charging thereof following assembly of the hydrodynamic bearing, and therefore, operation efficiency can be improved and reduction of the volume of lubricant 20 charged to the sleeve 2 can also be prevented. As a result, the reliability of the hydrodynamic bearing can be improved.

FIG. 9 is a view of an information recording and reproducing apparatus 53 using a spindle motor provided with the hydrodynamic bearing according to the present invention. Although the hydrodynamic bearing according to the prevent invention is particularly suitable for the spindle motors of disk drive devices, reel drive devices, capstan drive devices, drum drive devices, and other information recording and reproducing apparatuses, the usage thereof is not limited to these applications, and the hydrodynamic bearing according to the prevent invention can also be used in other devices such as, for example, MPU fans used to cool the MPUs used in personal computers.

What is claimed is:

1. A hydrodynamic bearing, comprising:
   a shaft;
   a sleeve provided with a bearing hole having a closed end of one end and an open end at the other end and wherein the shaft is inserted into the bearing hole so as to be capable of relative rotation;
   a cover configured to cover an end face and an outer peripheral surface of the sleeve at the open-end side thereof and at a distance forming a gap;
   a connecting channel configured to connect a space region at the closed-end side of the sleeve and a gap region between the cover and the open-end side of the sleeve;
   a lubricant retained in a space in the vicinity of the sleeve and including the space between the cover and the sleeve;
   a sleeve end face gap section configured to be formed in order that the lubricant moves from the connecting channel to the bearing hole between the cover and an end face at the open-end side of the sleeve and including an introducing gap section formed in close proximity to an opening section of the connecting channel;
   a vent hole configured to be formed in a space between an inner peripheral surface of the cover and an outer peripheral surface of the sleeve so as to connect with outside air and connected to the introducing gap section; and
   a first lubricant reservoir section configured to be formed between the inner peripheral surface of the cover and the opposing outer peripheral surface of the sleeve by forming a depression in one of the sleeve and the cover, or both thereof so as to provide a space larger than the end face gap section, capable of storing the lubricant therein, and shaped such that a gap between the inner peripheral surface of the cover and the outer peripheral surface of the sleeve grows larger as a distance from the vent hole in a circumferential direction decreases.

2. The hydrodynamic bearing of claim 1,
   wherein a space region at the closed-end side of the sleeve is formed by the tip of the shaft and a region closing plate of the closed-end side; and
   the opening section of the connecting channel provided on the closed-end face side of the sleeve connects to a space faced by the tip of the shaft.

3. The hydrodynamic bearing of claim 1,
   wherein a hydrodynamic groove provided on at least one of the outer peripheral surface of the shaft and the inner peripheral surface of the sleeve is shaped so as to impart circulating force to the lubricant.

4. The hydrodynamic bearing of claim 1,
   wherein a hydrodynamic groove provided on at least one of the outer peripheral surface of the shaft and the inner peripheral surface of the sleeve is shaped so as to impart circulating force to the lubricant.

5. The hydrodynamic bearing of claim 1,
   wherein the cover includes a material having a translucent or transparent property.

6. The hydrodynamic bearing of claim 1,
wherein a thrust flange fixed to a tip of the shaft is provided in a space region at the closed-end face side of the sleeve; and
an opening section of the connecting channel provided on the closed-end side of the sleeve connects to the space wherein the thrust flange is provided.

7. The hydrodynamic bearing of claim 6,
wherein a hydrodynamic groove provided on at least one of the outer peripheral surface of the shaft and the inner peripheral surface of the sleeve is shaped so as to impart circulating force to the lubricant.

8. A spindle motor provided with the hydrodynamic bearing of claim 1.

9. An information recording and reproducing apparatus provided with the spindle motor of claim 8.

10. The hydrodynamic bearing of claim 1,
wherein a thrust flange fixed to a tip of the shaft is provided in a space region at the closed-end face side of the sleeve; and
an opening section of the connecting channel provided on the closed-end side of the sleeve connects to the space wherein the thrust flange is provided.

11. The hydrodynamic bearing of claim 1,
wherein a space region at the closed-end side of the sleeve is formed by the tip of the shaft and a region closing plate of the closed-end side; and
the opening section of the connecting channel provided on the closed-end face side of the sleeve connects to a space faced by the tip of the shaft.

12. The hydrodynamic bearing of claim 1, further comprising:
a second lubricant reservoir section configured to be formed in an inner peripheral surface of the cover opposing the shaft so as to connect with outside air wherein the lubricant is stored;
wherein the second lubricant reservoir section
includes an inclined surface inclined such that an internal diameter widens in line with separation from the open-end side end face of the sleeve in the axis direction; and
is configured such that a surface tension of the lubricant stored in the second lubricant reservoir section and a surface tension of the lubricant of the first lubricant reservoir section formed in the outer peripheral surface side of the sleeve are substantially equalized.

13. The hydrodynamic bearing of claim 12,
wherein a relationship $g1<g2<g3$ is satisfied when
$g1$ is a gap of the sleeve end face gap section formed between the cover and the sleeve end face;
$g2$ is a gap of a side surface gap section formed between the cover and the outer peripheral surface of the sleeve; and
$g3$ is a minimum gap of the first lubricant reservoir section.

14. The hydrodynamic bearing of claim 12,
wherein the cover comprises a ventilation hole on an outer peripheral surface thereof,
the ventilation hole has a semicircular shape or the shape of a section of a circle on a end face of the cover.

15. The hydrodynamic bearing of claim 12,
wherein a thrust flange fixed to a tip of the shaft is provided in a space region at the closed-end face side of the sleeve; and
an opening section of the connecting channel provided on the closed-end side of the sleeve connects to the space wherein the thrust flange is provided.

16. The hydrodynamic bearing of claim 12,
wherein a space region at the closed-end side of the sleeve is formed by the tip of the shaft and a region closing plate of the closed-end side; and
the opening section of the connecting channel provided on the closed-end face side of the sleeve connects to a space faced by the tip of the shaft.

17. The hydrodynamic bearing of claims 12,
wherein a hydrodynamic groove provided on at least one of the outer peripheral surface of the shaft and the inner peripheral surface of the sleeve is shaped so as to impart circulating force to the lubricant.

18. The hydrodynamic bearing of claim 1,
wherein a relationship $g1<g2<g3$ is satisfied when
$g1$ is a gap of the sleeve end face gap section formed between the cover and the sleeve end face;
$g2$ is a gap of a side surface gap section formed between the cover and the outer peripheral surface of the sleeve; and
$g3$ is a minimum gap of the first lubricant reservoir section.

19. The hydrodynamic bearing of claim 18,
wherein a thrust flange fixed to a tip of the shaft is provided in a space region at the closed-end face side of the sleeve; and
an opening section of the connecting channel provided on the closed-end side of the sleeve connects to the space wherein the thrust flange is provided.

20. The hydrodynamic bearing of claim 18,
wherein a space region at the closed-end side of the sleeve is formed by the tip of the shaft and a region closing plate of the closed-end side; and
the opening section of the connecting channel provided on the closed-end face side of the sleeve connects to a space faced by the tip of the shaft.

21. The hydrodynamic bearing of claim 18,
wherein a hydrodynamic groove provided on at least one of the outer peripheral surface of the shaft and the inner peripheral surface of the sleeve is shaped so as to impart circulating force to the lubricant.

22. The hydrodynamic bearing of claim 18,
wherein the cover is made of polyetherimide resin or polyethersulfone resin.

23. A hydrodynamic bearing comprising:
a shaft,
a sleeve provided with a bearing hole having a closed end of one end and an open end at the other end and wherein the shaft is inserted into the bearing hole so as to be capable of relative rotation;
a cover configured to cover an end face on the open-end side of the sleeve and an outer peripheral side surface section of the sleeve at a distance forming a gap or a space,
wherein a connecting channel is configured to connect a space region at the closed-end face side of the sleeve and a gap region between the cover and the open-end side of the sleeve;
a lubricant is retained in a sleeve internal space including a space between the cover and the sleeve;
a sleeve end face gap section configured to be formed between the cover and an open-end-side end face of the sleeve in order that the lubricant moves from the connecting channel to the bearing hole, and in addition, an introducing gap section is formed connecting to the sleeve end face gap section in a region in close proximity to an opening section of the connecting channel;
a vent hole that connects a space between a cover inner peripheral section of the cover and a sleeve outer peripheral side surface with outside air;

the introducing gap section is connected to the vent hole a first lubricant reservoir section capable of storing lubricant is formed between the cover inner peripheral section and the opposing outer peripheral side surface of the sleeve by forming a depression in one of the sleeve and the cover, or both thereof so as to provide a space larger than a gap of the sleeve end face gap section; and the first lubricant reservoir section is formed such that a separation distance between the inner peripheral side surface of the cover and the outer circumferential side surface of the sleeve grows larger as a distance from the vent hole side in a peripheral direction decreases.

\* \* \* \* \*